June 23, 1942.   J. W. LOURIÉ   2,287,112
MAGNETIC CLAMP
Filed July 22, 1941

INVENTOR.
JACQUES W. LOURIÉ
BY
ATTORNEYS

Patented June 23, 1942

2,287,112

UNITED STATES PATENT OFFICE 2,287,112

MAGNETIC CLAMP

Jacques W. Lourié, New York, N. Y.

Application July 22, 1941, Serial No. 403,518

5 Claims. (Cl. 219—8)

This invention relates to apparatus for supporting the ground wire of an electric arc welding machine. More particularly, it relates to a magnetic clamp for establishing pressure contact between the metallic body to be welded and the terminal block of a conductor.

Electric arc welding apparatus is normally provided with two feed lines, the one line leading from the welding machine to the electrode holder and the other leading to a terminal block for making electrical contact to the object to be welded. It is with this terminal block and the means for insuring good electrical contact that this invention is concerned. In some instances it is the practice to fasten the terminal block to the work piece by a screw or spring clamp. This method of making contact, although time consuming, is satisfactory in a great many cases. However, operators are often careless and use clamps of insufficient size and thereby permit increased resistance and subsequent overheating at the point of contact. In a great many other cases, the use of such screw or spring clamping means is entirely impractical. This is particularly true in those cases in which a terminal block is to be attached to a large smooth surface, which is not provided with protuberances to which to clamp the block, and where the surface may not be deformed.

The problem of making good electrical contact to smooth surfaces of this type was met with in other fields and overcome to some extent by the development of magnetic devices to hold the terminal block in contact with a portion of the flat surface. However, none of the magnetic clamps heretofore developed is completely satisfactory for arc welding work where the current flow is often intermittent. The clamps of the prior art were developed primarily for use with a constant current flow through the terminal block where the contact, once made, would be effective throughout the entire operation, or for use in such cases in which the terminal block could be placed on a horizontal surface to make contact. In the latter case, the block would be held in position by the force of gravity during those periods in which the magnet became ineffective because of lack of current flow through the terminal block. In a great many cases, however, it is impractical to attach the terminal block to a horizontal surface or in such position where its mere weight will hold it in good electrical contact with the surface of the work piece. When clamps of the prior art are used in such places they must be refastened and reattached after every current break. Even in those cases where the contact surface of the clamp will stay put it is often necessary to readjust the clamp after every current break to insure good electrical contact.

The object of this invention is to provide a magnetic clamp for use in apparatus for electric arc welding which will cause the terminal block of the ground lead to be firmly pressed into good electrical contact with the body to be welded throughout any desired period, irrespective of whether or not any welding arc is being struck through this period.

Another object of this invention is to provide a magnetic clamp having a terminal block of good conducting characteristics and of sufficient size to carry the required current load with a minimum of resistance, and which will hold the terminal block in good electrical contact with a smooth surface, regardless of its angle of inclination.

A further object of this invention is to provide a magnetic clamp of simple construction which can be readily attached to, or detached from, the desired surface.

Other objects and advantages of the magnetic clamp of this invention will become apparent as the disclosure proceeds.

In the accompanying drawing illustrating an embodiment of this invention:

Figure 1:
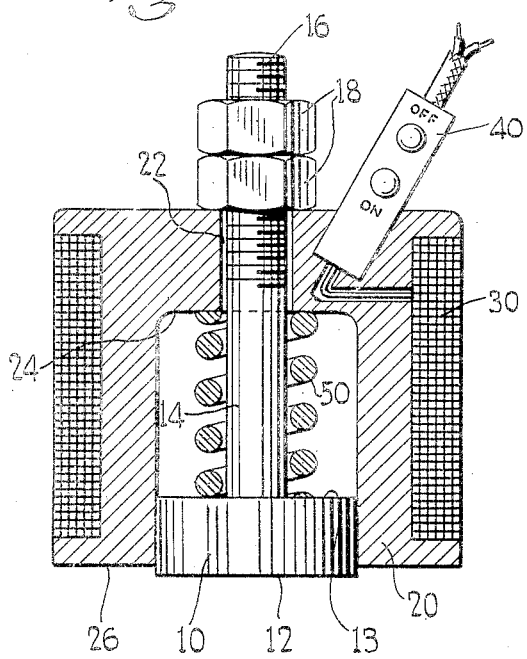
Figure 1 is a vertical section of a magnetic clamp showing the relative position of the various parts.
Figure 2:
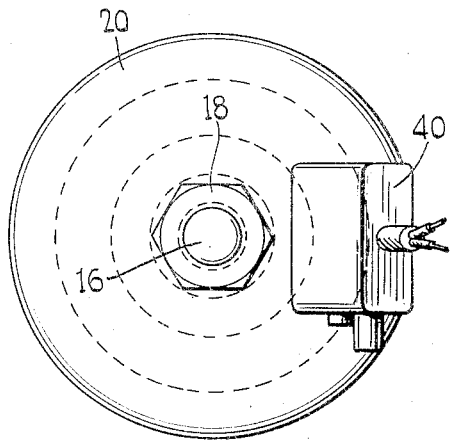
Figure 2 is a plan view of the clamp illustrated in Figure 1.

The form of magnetic clamp illustrating an embodiment of my invention includes a terminal black 10 of good conducting material provided with a relatively large contact surface, a resiliently supported magnetizable member 20, a magnetizing coil 30, an independent current source for the coil, and a switch 40 in the circuit of the independent current source positioned in close proximity to the magnetizable member.

Referring more specifically to the drawing which illustrate an embodiment of this invention, the terminal block 10, which is made of good conducting material, such as copper, is provided with a relatively large surface area 12 for contacting flat surfaces. It is disk-like in shape, and connected to a rod 14 which projects perpendicularly from its upper surface 13. The rod 14 serves both as a guide rod for a resiliently mounted magnetizable member 20 and as a means for coupling the terminal block to the ground feed cable 16. The coupling is accomplished by means of screw nuts 18.

The magnetizable member 20 may be of any desired shape, provided only that it has a suitable contact surface, and that the shape will permit of its being resiliently mounted on the terminal block with the plane of its contact surface substantially parallel to but slightly above that of the contact surface of the block. Preferably, the member should straddle the block. The illustrated member 20 is a soft iron cap-shaped core, provided with a bore 22 through its top wall, the bore being sufficiently large to permit the rod 14 to pass therethrough freely. It is resiliently supported on the terminal block by means of a spring 50 which abuts the top surface 13 of the block at one end and the shoulder 24 of the member 20 at the other. Under normal conditions, the spring holds the contact surface 26 of the member 20 at a retracted level, as shown in Figure 1. This permits the contact surface 12 of the block to rest on a smooth surface while the contact surface 26 is held in spaced relationship thereto. The screw nuts 18 which couple the rod 14 to the cable 16 are positioned to abut the top surface of the cap-like member 20 and hold it down against the resilient pressure exerted on the underside of the cap by spring 50. These screw nuts may also be used to regulate the distance between the plane of the contact surfaces 12 and 26.

A coil 30 is wound on the magnetizable member 20 in such manner as to cause the member 20 to become magnetized upon the passage of current therethrough. The circuit 60 through which current is supplied to the coil is separate and distinct from that through which current is supplied to the welding electrode. A switch 40 mounted on member 20 is connected into the circuit in order that the current flow through the circuit, and thereby the magnetic properties of the member, may be controlled at will.

When a magnetic clamp of the type herein described is used to hold a terminal block of a ground cable of an arc welding machine in electrical contact with a smooth surface, the contact will remain firm and offer a minimum amount of resistance to the passage of current. The clamp will be so held throughout any desired period regardless of whether an arc is being struck throughout this period, and regardless of the angle of inclination of the surface. The clamp facilitates the establishment of a firm pressure contact between the terminal block and the body to be welded. When contact is to be made the surface 12 of the terminal block is caused to contact the surface of the body to be welded. If, when this is done, the switch 40 controlling the circuit leading to coil 30 is open the contact surface 26 of the magnetizable member 20 will be held in spaced relationship to the surface of the body to be welded. Under these conditions, the contact surface 12 would only be held in position by the force of gravity. However, by closing the switch 40 electrical current will be fed to coil 30 and cause the member 20 to become magnetized. When this happens and the contact surfaces are in close proximity to a magnetic metal the surface 26 is pulled down into intimate contact with the metal. In doing this the magnetic force overcomes the resistance offered by the spring 50 which normally tends to cause the surface of the contact block to protrude beyond that of the surface 26 of the magnetizable member, as shown in Figure 1. Therefore, when the magnetic clamp has been applied, as set forth above, the magnetic member does more than merely hold the contact surface 12 of the terminal block in place. It holds it in pressure contact with the surface. This makes for good electrical contact at all times. Since the circuit controlling the current supply to the coil is independent of the circuit controlling the current supplied to the welding electrode, the magnetic clamp will hold the terminal block in good electrical contact irrespective of whether current is flowing through the terminal block at the time. The force with which the terminal block is held in contact does not vary and, therefore, readjustment and reattachment of the clamp are unnecessary throughout the period in which the magnet is effective. When desired, the clamp can be released in a very simple manner by using switch 40 to open the circuit by means of which current is supplied to the coil 30. The opening of the circuit will cause the member 20 to cease being a magnet and permit the compressed spring 50 to reexpand and cause the surface 12 to protrude below the plane of the surface 26. This forces the latter surface into spaced relationship with the plane of any surface contacted by surface 12, thus breaking any magnetic attraction between the member 20 and the surface of any body. With the magnetic attraction broken the terminal block can readily be removed from the contact surface.

Figure 3:
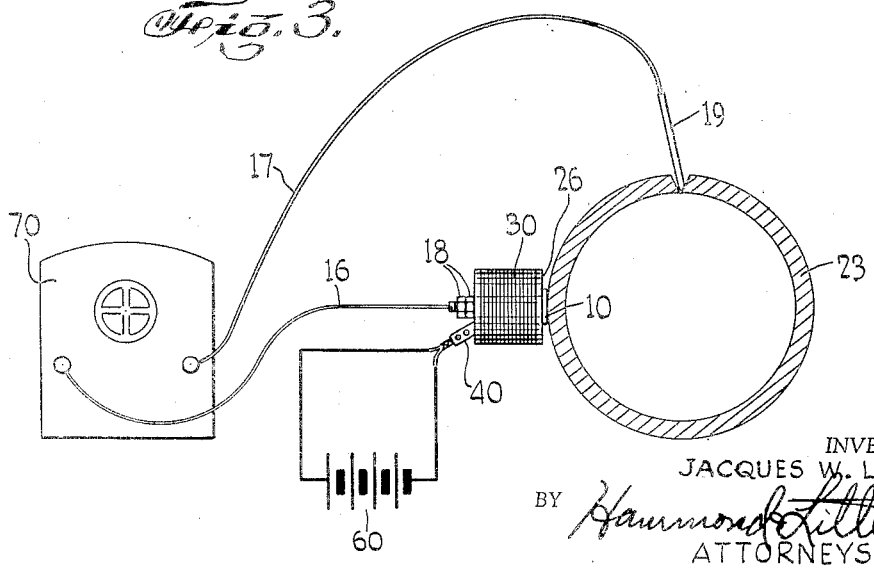
Figure 3 is a diagrammatic view of a welding machine, the work piece and the magnetic clamp affixed to a vertical side wall.

Figure 3 of the drawing is illustrative of the relative position of the various elements during a typical welding operation. It shows the welding machine 70 with the two leads 16 and 17, lead 17 being connected to the welding electrode 19 and lead 16 connected to the terminal block of the magnetic clamp 21. The clamp is there shown to be attached to the vertical wall of the work piece 23. The clamp is shown to be connected to a separate current source through a circuit provided with a switch 40 for controlling the current fed to the magnetizing coil.

The distance between the planes of the surfaces 12 and 26 when the magnetic current is off can be varied by regulating the screw nuts 18. These nuts abut the top surface of the cap-like member and hold the member down against the spring pressure exerted on the underside of the top of the cap by the spring 50.

Owing to the relatively large dimensions of the terminal block very little resistance is offered to the passage of current. This eliminates undesirable heating which is often occasioned by the careless use of a clamp which is too small for the job intended, and therefore the resulting poor current flow which impedes welding.

Other desirable features of the magnetic clamp of the invention and advantages to be gained by their use will become apparent to those skilled in the art.

It will be understood that the embodiment of the invention described in this specification and illustrated by the drawing is only one form of magnetic clamp of this invention. I therefore desire an interpretation of the invention which is fully commensurate with its contribution as set forth in the claims appended hereto.

I claim:

1. In an apparatus for arc welding, a magnetic clamp for establishing pressure contact between the ground lead and the metallic body to be welded, comprising a terminal block in electrical contact with the ground lead and provided with a suitable surface for making good electrical contact with a metallic body, a resiliently supported magnetizable member mounted on said block, said magnetizable member being provided with a surface for making contact with a metallic body, and a coil associated with said member for magnetizing the same, said coil being fed by an independent current source, said terminal block and said magnetizable member being so arranged that when the contact surface of the terminal block is brought into contact with the surface of the work piece the contact surface of the magnetizable member will be in spaced relationship to the surface of the work piece when no current is passing through said coil, and said magnetizable member being adapted to pull toward the work piece against resilient pressure when current is passing through the coil and hold the terminal block in positive pressure contact with the work piece.

2. In an apparatus for arc welding, a magnetic clamp for establishing pressure contact between the ground lead and the metallic body to be welded, comprising a terminal block in electrical contact with a ground lead and provided with a surface for making good electrical contact with a metallic body, a spring supported magnetizable member mounted on said terminal block, said magnetizable member being provided with a surface for making contact with a metallic body, a coil associated with said magnetizable member for magnetizing the same, said coil being fed by an independent current source, and a switch connected in the circuit of the independent source mounted on said magnetizable member, said terminal block and said magnetizable member being said arranged that when the contact surface of the terminal block is brought into contact with the surface of the work piece the contact surface of the magnetizable member will be in spaced relationship to the surface of the work piece when no current is passing through the coil, and said member being adapted to pull toward the work piece against the spring pressure, when current is passing through the associated coil and thus hold the terminal block in firm pressure contact with the work piece.

3. In an apparatus for arc welding, a magnetic clamp for establishing pressure contact between the ground lead and a metallic body to be welded, comprising a terminal block in electrical contact with the ground lead, an annular magnetizable core encircling said terminal block and resiliently mounted thereon, a magnetizing coil wound on said core, said coil being fed by an independent current source, and a switch for controlling the current fed to said coil, said terminal block and said annular core being so arranged that the contact surface of said terminal block protrudes slightly beyond the contact surface of said annular core when no current is passing through the said magnetizable coil.

4. In an apparatus for arc welding, a magnetic clamp for establishing pressure contact between the ground lead and the metallic body to be welded, comprising a terminal block mounted on a shaft in electrical contact with the ground lead, a cap-like magnetizable member resiliently mounted on said terminal block, a bore through the top of said cap-like member with the shaft of said terminal block protruding therethrough, a coil wound on said cap-like member for magnetization, an independent current source for feeding said coil, and a switch mounted on said cap-like member for making and breaking the circuit connecting said coil to its current source.

5. In an apparatus for arc welding, a magnetic clamp for establishing pressure contact between the ground lead and the metallic body to be welded, comprising a disk-like terminal block, a perpendicularly projecting rod, a cap-shaped magnetizable member, a bore through the top wall of said member, a spring mounted on said perpendicularly projecting rod with one end abutting said terminal block, a magnetizing coil wound on said magnetizable member, an independent circuit for supplying current to said coil, and a switch for said circuit, said magnetizable member being resiliently mounted on said terminal block with said rod passing through said bore and said upper end of said spring abutting the underside of the top of the cap-shaped member.

JACQUES W. LOURIÉ.